United States Patent
Iwama et al.

(10) Patent No.: US 9,842,693 B2
(45) Date of Patent: Dec. 12, 2017

(54) MULTILAYER CERAMIC CAPACITOR

(71) Applicant: TDK CORPORATION, Tokyo (JP)

(72) Inventors: Masahiro Iwama, Nikaho (JP); Kenya Tamaki, Tokyo (JP); Fumiaki Satoh, Tokyo (JP); Kenta Yamashita, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

(21) Appl. No.: 14/959,363

(22) Filed: Dec. 4, 2015

(65) Prior Publication Data
US 2016/0163455 A1    Jun. 9, 2016

(30) Foreign Application Priority Data
Dec. 9, 2014 (JP) ................................. 2014-248653

(51) Int. Cl.
| | |
|---|---|
| *H01G 4/012* | (2006.01) |
| *H01G 4/30* | (2006.01) |
| *H01G 4/38* | (2006.01) |
| *H01G 4/232* | (2006.01) |
| *H01G 4/12* | (2006.01) |

(52) U.S. Cl.
CPC ............ *H01G 4/012* (2013.01); *H01G 4/232* (2013.01); *H01G 4/30* (2013.01); *H01G 4/385* (2013.01); *H01G 4/12* (2013.01)

(58) Field of Classification Search
CPC .......... H01G 4/30; H01G 4/012; H01G 4/232; H01G 4/005; H01G 4/228; H01G 4/248; H01G 4/0085; H01G 4/33
See application file for complete search history.

(56) References Cited

U.S. PATENT DOCUMENTS

| | | | | |
|---|---|---|---|---|
| 5,072,329 | A * | 12/1991 | Galvagni | H01G 4/30 29/25.42 |
| 6,292,351 | B1 * | 9/2001 | Ahiko | H01G 4/232 361/306.3 |
| 2004/0042156 | A1 * | 3/2004 | Devoe | H01G 4/228 361/321.2 |
| 2006/0187612 | A1 * | 8/2006 | Yamane | H01G 4/30 361/303 |

(Continued)

FOREIGN PATENT DOCUMENTS

| | | |
|---|---|---|
| CN | 102103927 A | 6/2011 |
| CN | 104078236 A | 10/2014 |
| JP | H10-22160 A | 1/1998 |

*Primary Examiner* — Dion R Ferguson
(74) *Attorney, Agent, or Firm* — Oliff PLC

(57) ABSTRACT

A multilayer ceramic capacitor includes an element body, a first terminal electrode, a second terminal electrode, and a plurality of internal electrodes. The plurality of internal electrodes include a plurality of first internal electrodes, a plurality of second internal electrodes, a plurality of third internal electrodes, and a plurality of fourth internal electrodes. The element body includes a plurality of first and second regions. The first regions are located between the first internal electrodes opposed with each other. The second regions are located between the first internal electrodes opposed to each other through the third internal electrodes, and between the second internal electrodes opposed to each other through the fourth internal electrodes. The first regions and the second regions are alternately located in the first direction.

8 Claims, 10 Drawing Sheets

(56) References Cited

U.S. PATENT DOCUMENTS

| | | | | |
|---|---|---|---|---|
| 2008/0084651 A1* | 4/2008 | Oguni | ...................... | H01G 4/30 361/303 |
| 2011/0149466 A1* | 6/2011 | Hwang | .................. | H01G 4/012 361/303 |
| 2011/0235232 A1* | 9/2011 | Takeuchi | ................. | H01G 4/01 361/301.1 |
| 2011/0235234 A1* | 9/2011 | Yamamoto | ............. | H01G 4/232 361/321.1 |
| 2013/0241361 A1* | 9/2013 | Lee | ......................... | H01G 4/30 310/366 |
| 2014/0240895 A1* | 8/2014 | Lee | ......................... | H01G 4/12 361/301.4 |
| 2014/0290998 A1* | 10/2014 | Ahn | ........................ | H01G 4/30 174/260 |
| 2015/0170842 A1* | 6/2015 | An | ......................... | H01G 4/30 361/321.2 |
| 2016/0163462 A1 | 6/2016 | Ahn et al. | | |

* cited by examiner

| Element body T dimension | Thickness T1 of outer layer on one side | T1/T | Crack occurrence rate |
|---|---|---|---|
| μm | μm | % | % |
| Example 1 | 1200 | 40 | 3.3 | 0.001 |
| Example 2 | 1200 | 60 | 5.0 | 0.001 |
| Example 3 | 1200 | 120 | 10 | 0.005 |
| Example 4 | 1200 | 180 | 15 | 0.019 |
| Example 5 | 1200 | 240 | 20 | 0.074 |
| Example 6 | 1200 | 300 | 25 | 0.28 |

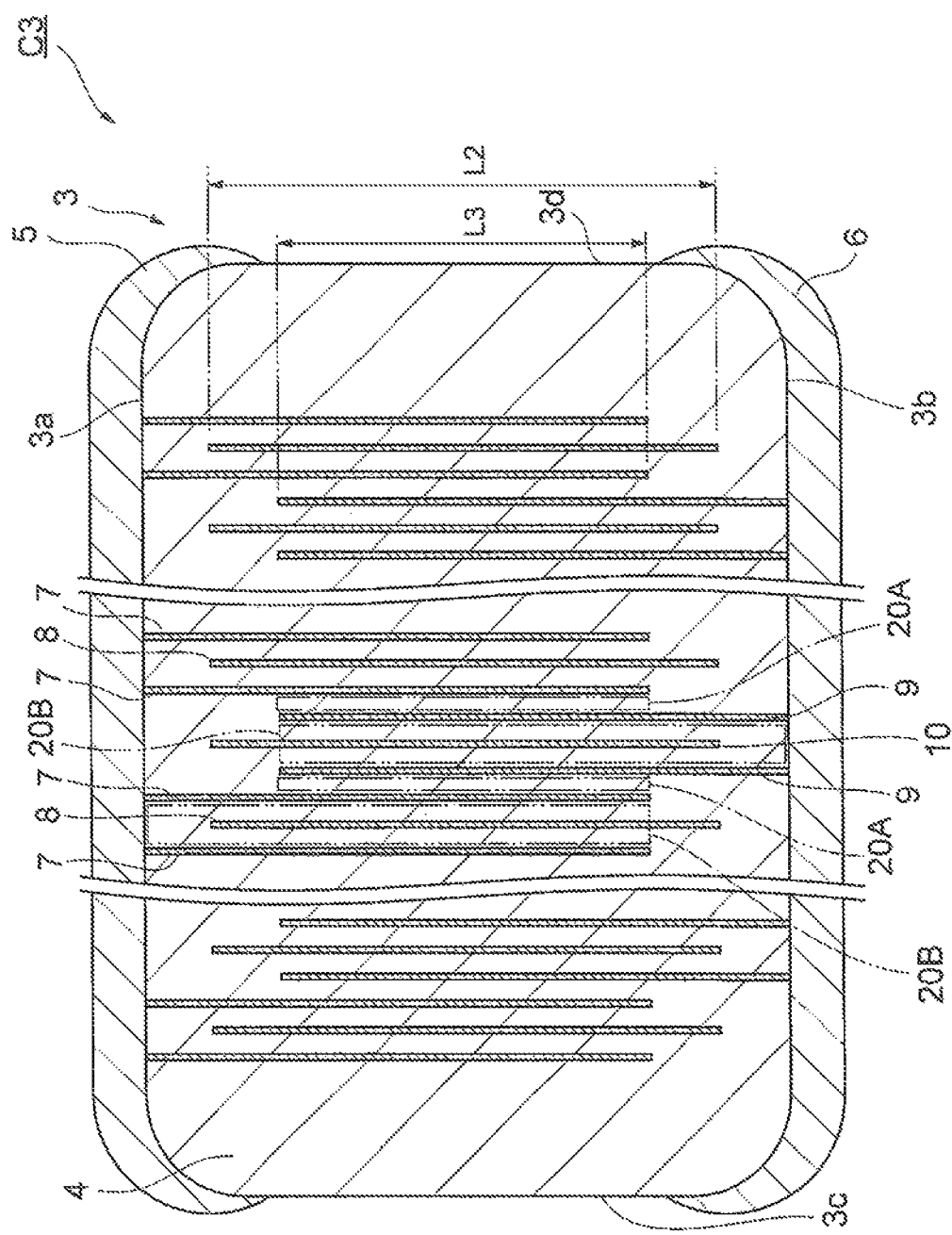
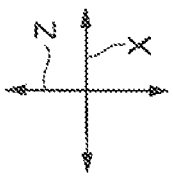
Fig. 8

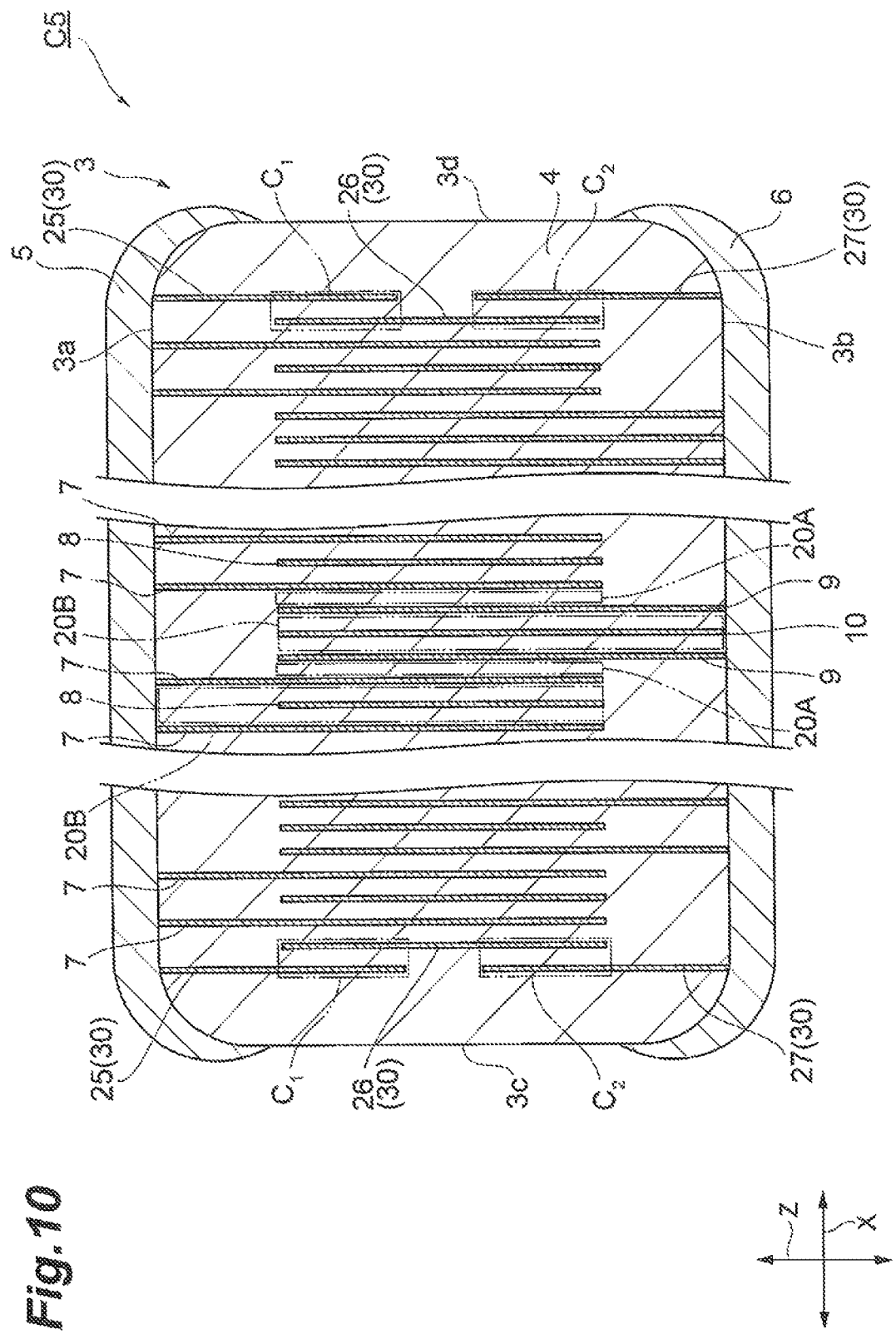

MULTILAYER CERAMIC CAPACITOR

TECHNICAL FIELD

The present invention relates to a multilayer ceramic capacitor.

BACKGROUND

Known multilayer ceramic capacitors include an element body including a dielectric, a first terminal electrode, a second terminal electrode, and a plurality of internal electrodes (for example, Japanese Unexamined Patent Publication No. H10-22160 (hereinafter referred to as Patent Document 1)). The element body includes a first main surface, a second main surface, a first side surface, a second side surface, a third side surface, and a fourth side surface. The first main surface and the second main surface extend in a first direction and a second direction intersecting the first direction, and are opposed to each other. The first side surface and the second side surface extend in the second direction and in a third direction, in which the first main surface and the second main surface are opposed to each other so as to connect between the first main surface and the second main surface, and opposed to each other. The third side surface and the fourth side surface extend in the first direction and the third direction so as to connect between the first main surface and the second main surface, and are opposed to each other. The first terminal electrode is arranged on the first main surface. The second terminal electrode is arranged on the second main surface. The plurality of internal electrodes are arranged so as to be opposed to each other inside the element body.

In the multilayer ceramic capacitor described in Patent Document 1, the plurality of internal electrodes arranged inside the element body include a plurality of first internal electrodes connected to the first terminal electrode, and a plurality of second internal electrodes connected to the second terminal electrode. The first internal electrodes and the second internal electrodes are arranged alternately to be adjacent to each other. Thus, since the first internal electrodes and the second internal electrodes connected to the terminal electrodes having different polarities are opposed to each other, capacitance is caused between the first internal electrodes and the second internal electrodes.

SUMMARY

In the multilayer ceramic capacitor described in Patent Document 1, numbers of the first internal electrodes and the second internal electrodes required to ensure desired capacitance are arranged in only a central portion in the first direction inside the element body. That is, in the element body, a region of the dielectric on the outer side in which the plurality of internal electrodes are not arranged is wider than a region in which the plurality of internal electrodes are arranged. In such a case, cracks are likely to occur inside the element body.

For example, there is a difference in thermal shrinkage caused in an element-body firing process between a material for forming the plurality of internal electrodes and a material for forming the dielectric. In the multilayer ceramic capacitor described in Patent Document 1, since the region of the dielectric in which the plurality of internal electrodes are not arranged is wider than the region in which the plurality of internal electrodes are arranged, cracks are likely to occur due to the difference in the thermal skrinkage. Further, when a voltage is applied to the multilayer ceramic capacitor, mechanical strain occurs in the element body due to an electrostrictive effect. The mechanical strain due to the electrostriction effect generates stress in the element body. In the multilayer ceramic capacitor described in Patent Document 1, since the region in which the internal electrodes are arranged is located in only the central portion of the element body, the stress is disproportionately generated in the central portion of the element body. Therefore, cracks are likely to occur in the element body.

An object of the present invention is to provide a multilayer ceramic electronic part capable of suppressing occurrence of cracks while ensuring desired capacitance.

A multilayer ceramic capacitor according to an aspect of the present invention includes an element body including a dielectric, a first terminal electrode and a second terminal electrode, and a plurality of internal electrodes. The element body includes a first main surface, a second main surface, a first side surface, a second side surface a third side surface, and a fourth side surface. The first main surface and the second main surface extend in a first direction and a second direction intersecting the first direction, and are opposed to each other. The first side surface and the second side surface extend in the second direction and in a third direction that is a direction in which the first main surface and the second main surface are opposed to each other so as to connect between the first main surface and the second main surface, and are opposed to each other. The third side surface and the fourth side surface extend in the first direction and the third direction so as to connect between the first main surface and the second main surface, and are opposed to each other. The first terminal electrode is arranged on the first main surface. The second terminal electrode is arranged on the second main surface. The plurality of internal electrodes are arranged at the same intervals in the first direction so as to are opposed to each other inside the element body. A length in the first direction of the element body is greater than a length in the third direction of the meat body and is smaller than or equal to a length in the second direction of the element body. A length in the second direction of the plurality of internal electrodes is greater than a length in the third direction of the plurality of internal electrodes. The plurality of internal electrodes include a plurality of first internal electrodes, a plurality of second internal electrodes, a plurality of third internal electrodes, and a plurality of fourth internal electrodes. The plurality of first internal electrodes are connected to the first terminal electrode and are not connected to the second terminal electrode. The plurality of second internal electrodes are connected to the second terminal electrode and are not connected to the first terminal electrode. The plurality of third internal electrodes are not connected to at least the second terminal electrode. The plurality of fourth internal electrodes are not connected to at least the first terminal electrode. The element body includes a plurality of first regions and a plurality of second regions. The plurality first regions are located between the first internal electrodes and the second internal electrodes opposed to each other. The plurality of second regions are located between the first internal electrodes opposed to each other through the third internal electrodes, and between the second internal electrodes opposed to each other through the fourth internal electrodes. The first regions and the second regions are alternately located in the first direction.

In the multilayer ceramic capacitor according to an aspect the present invention, since the length in the first direction of the element body is greater than the length in the third direction and is smaller than or equal to the length in the second direction of the element body, the element body has a low profile. The first terminal electrode is arranged on the first main surface of the element body, and the second retinal electrode is arranged on the second main surface of the element body. Accordingly, the first main surface or the second main surface constitutes a mounting surface for another electronic device. When the element body is configured by stacking a plurality of dielectric layers in the first direction parallel to the first main surface or the second main surface, a multilayer ceramic capacitor in which the element body has a low profile can be realized even when the number of layers increases.

The first internal electrodes connected to the first terminal electrode and the second internal electrodes connected to the second terminal electrode have different polarities from each other. The first region located between the first and second internal electrodes opposed to each other causes capacitance. The first internal electrodes have the same polarities. The third internal electrodes not connected to the second terminal electrode do not have at least a polarity different from the first internal electrodes. The second internal electrodes have the same polarities. The fourth internal electrodes not connected to the first terminal electrode do not have a least a polarity different from that of the second internal electrodes. Thus, the second region located between the first internal electrodes opposed to each other through the third internal electrodes and the second region located between the second internal electrodes opposed to each other through the fourth internal electrodes do not cause capacitance.

The element body includes an arrangement region in which the plurality of internal electrodes are arranged, and a non-arrangement region in which the plurality of internal electrodes are not arranged. The arrangement region includes a plurality of first regions causing capacitance, and a plurality of second regions causing no capacitance. Desired capacitance is ensured by the plurality of first regions. The second region causing no capacitance is included in the arrangement region. Therefore, the multilayer ceramic capacitor of the above aspect, for example, has a greater length in the first direction of the arrangement region and a smaller length in the first direction of the non-arrangement region than a multilayer ceramic capacitor in which the internal electrodes having different polarities are alternately arranged and that has the element body of the same size as and has the same capacitance as the multilayer ceramic capacitor of the above aspect.

In the arrangement region, all of the internal electrodes are arranged at the same intervals in the first direction. Therefore, in the arrangement region, it is difficult for cracks caused by the difference in the thermal shrinkage to occur. In the multilayer ceramic capacitor of the above aspect, the arrangement region is large, that is, a region in which it is difficult for the cracks caused by the difference in the thermal shrinkage to occur is wide, as compared to the above-described comparison capacitor. Therefore, it is possible to suppress the occurrence of cracks caused by the difference in thermal shrinkage in the entire element body. In the multilayer ceramic capacitor of the above aspect, the mechanical strain due to the electrostrictive effect occurs in the first region, whereas the mechanical strain due to the electrostrictive effect does not occur in the second region. Since the first region and the second region are alternately located in the first direction, a region in which the mechanical strain due to the electrostrictive effect occurs is more distributed in the arrangement region than in a configuration in which the arrangement region does not include the second region. Accordingly, concentration of stress caused by the mechanical strain is suppressed. Thus, it is possible to suppress occurrence of cracks in the element body.

Thus, it is possible to provide the multilayer ceramic capacitor capable of suppressing occurrence of cracks while ensuring desired capacitance.

In the multilayer ceramic capacitor according to the above aspect, intervals between the third internal electrodes and the first internal electrodes and intervals in the first direction between the fourth internal electrodes and the second internal electrodes may be the same as each other.

In the multilayer ceramic capacitor according to the above aspect, the element body may include an inner layer portion, and a pair of outer layer portions arranged with the inner layer interposed therebetween in the first direction, and a ratio of a length in the first direction of each outer layer portion to a length in the first direction of the element body may be 0.05 to 0.2. In this case, the plurality of internal electrodes are arranged in the inner layer portion. No internal electrodes are arranged in the outer layer portions. In the inner layer portion, all the internal electrodes are arranged at the same intervals in the first direction. Therefore, it is difficult for cracks caused by the difference in the thermal shrinkage to occur in the inner layer portion. When the ratio of the length in the first direction of each outer layer portion to the length in the first direction of the element body is 0.05 to 0.2, the length in the first direction of the inner layer portion can further increase. Therefore, it is possible to reliably suppress occurrence of cracks caused by the difference in thermal shrinkage.

In the multilayer ceramic capacitor according to the above aspect, a plurality of internal electrodes may include a plurality of first auxiliary electrodes, a plurality of second auxiliary electrodes, a plurality of third auxiliary electrodes, and a plurality of fourth auxiliary electrodes. In this case, the plurality of first auxiliary electrodes are arranged in the same layer as the first internal electrodes in the first direction and connected to the second terminal electrode. The plurality of second auxiliary electrodes are arranged in the same layer as the second internal electrodes in the first direction and connected to the first terminal electrode. The plurality of third auxiliary electrodes are arranged in the same layer as the third internal electrodes in the first direction and connected to the second terminal electrode. The plurality of fourth auxiliary electrodes are arranged in the same layer as the fourth internal electrodes in the first direction and connected to the first terminal electrode. It is possible to increase connection strength between the second terminal electrode and the element body using the first auxiliary electrodes or the third auxiliary electrodes. It is possible to increase connection strength between the first terminal electrode and the element body using the second auxiliary electrodes or the fourth auxiliary electrodes.

In the multilayer ceramic capacitor according to the above aspect, the third internal electrodes or the fourth internal electrodes may not be connected to either of the first terminal electrode and the second terminal electrode.

In the multilayer ceramic capacitor according to the above aspect, a length of the third internal electrodes or the fourth internal electrodes in a third direction may be greater than the length of the first region in the third direction. In this case, it is possible to suppress mechanical strain caused by the electrostrictive effect and to further suppress occurrence of cracks.

The multilayer ceramic capacitor according to the above aspect may further include an adjustment electrode. In this case, the adjustment electrode is arranged to face the first internal electrodes arranged on the outermost layer in the first direction among the plurality of internal electrodes. The adjustment electrode is connected to the second terminal electrode, and is not connected to the first terminal electrode. Capacitance is caused between the first internal electrodes arranged on the outermost layer in the first direction among the plurality of internal electrodes and the adjustment electrode. Accordingly, the multilayer ceramic capacitor of which the capacitance has been finely adjusted can be obtained.

In the multilayer ceramic capacitor according to the above aspect, a plurality of adjustment electrodes may be further included. In this case, the plurality of adjustment electrodes are arranged with dielectric interposed therebetween so that a plurality of capacitive components connected in series between the first terminal electrode and the second terminal electrode are constituted on the outermost layer in the first direction. Since the plurality of capacitive components connected in series are constituted on the outermost layer in the first direction, the multilayer ceramic capacitor of which the capacitance has been finely adjusted more easily can be obtained.

BRIEF DESCRIPTION OF THE DRAWINGS

FIG. 6 is a table showing a measurement result of an example.

FIG. 8 is a cross-sectional views of a multilayer ceramic capacitor according to a third embodiment.

FIG. 10 is a cross-sectional view of a multilayer ceramic capacitor according to a fifth embodiment.

DETAILED DESCRIPTION

Hereinafter, embodiments of the present invention will be described in detail with reference to the accompanying drawings. In the following description, the same elements or elements having the same functions are denoted with the same reference signs, and repeated description will be omitted.

First Embodiment

Figure 1:
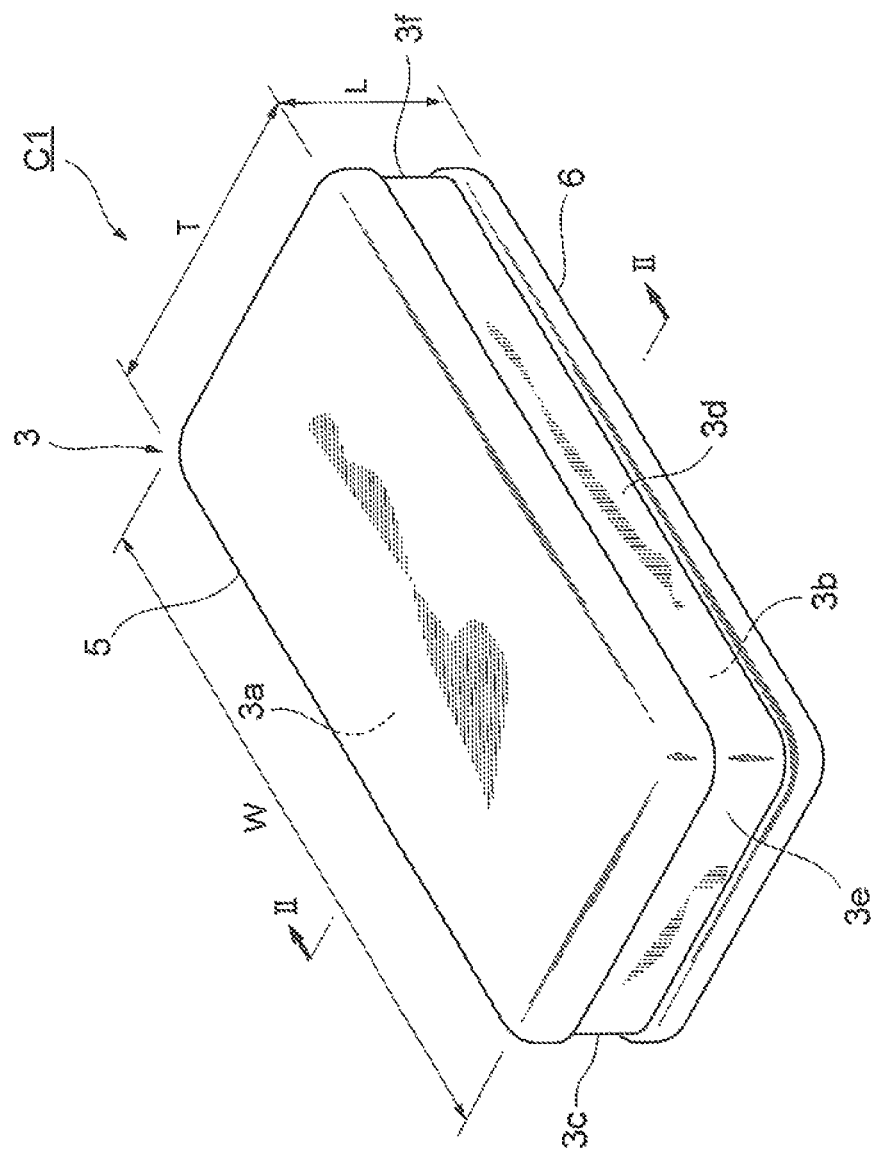
FIG. 1 is a perspective view of a multilayer ceramic capacitor according to a first embodiment.
Figure 2:
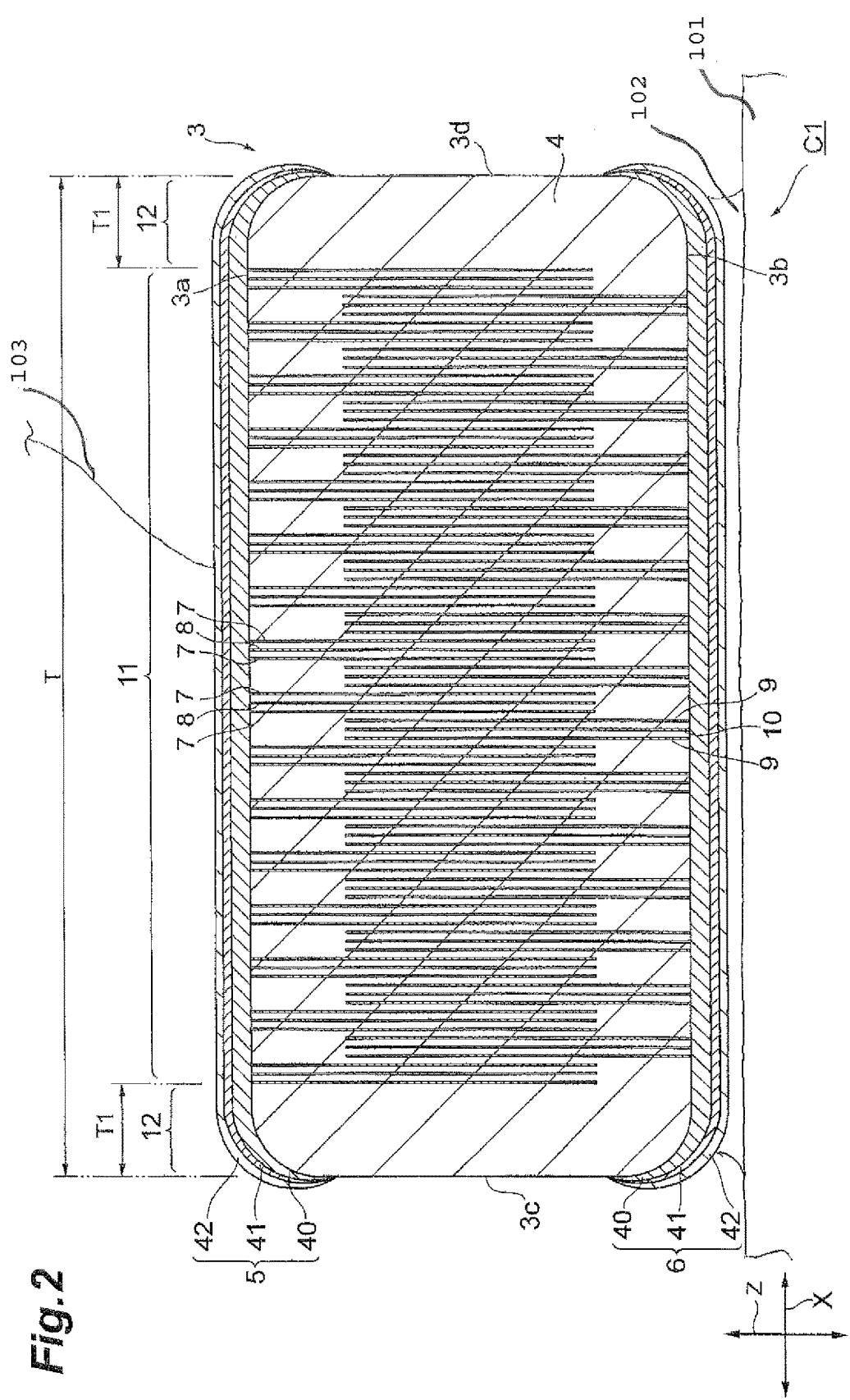
FIG. 2 is a cross-sectional view taken a line II-II illustrated in FIG 1.
Figure 3:
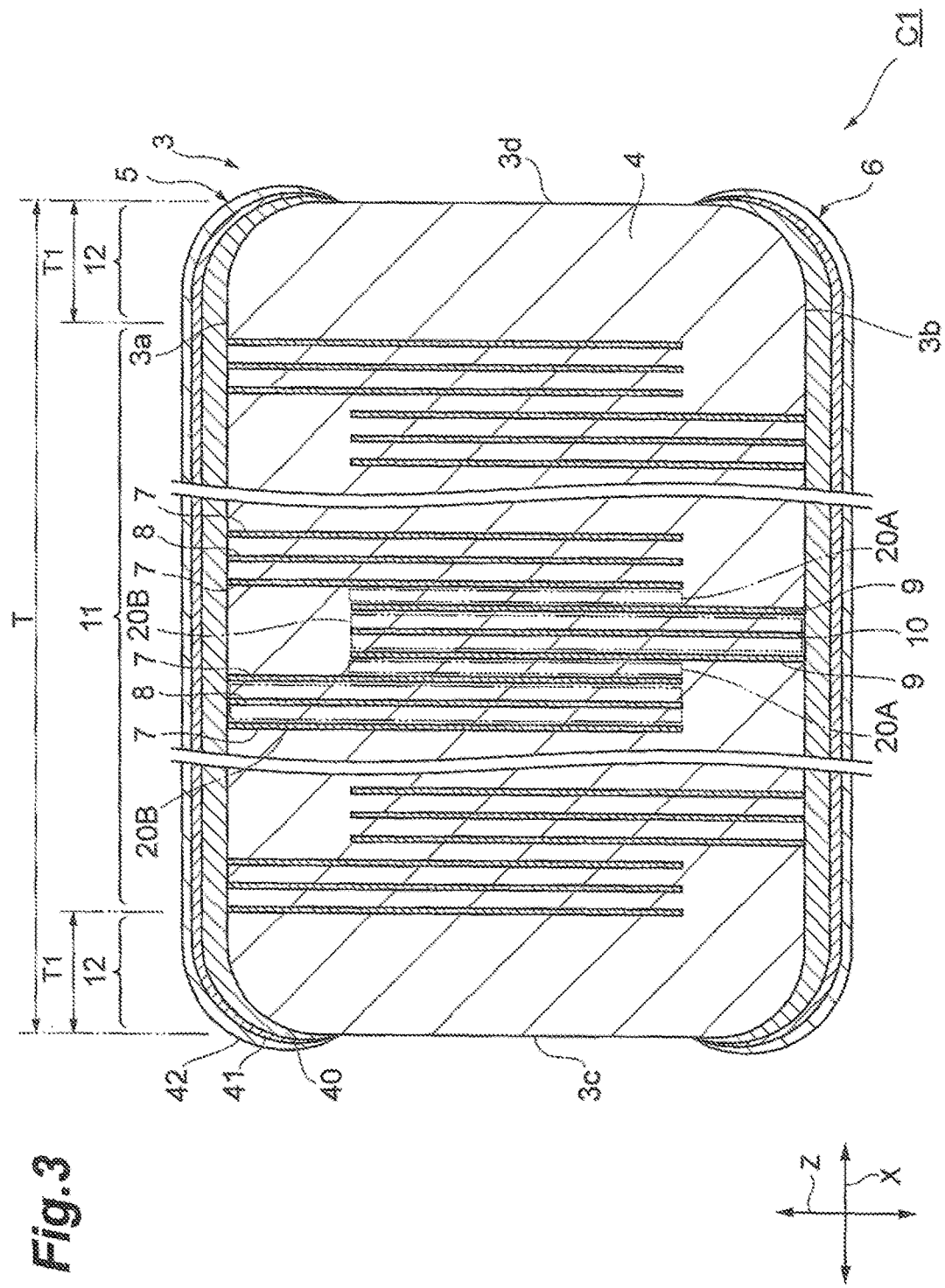
FIG. 3 is a cross-sectional view taken along a line II-II illustrated in FIG 1.
Figure 4:
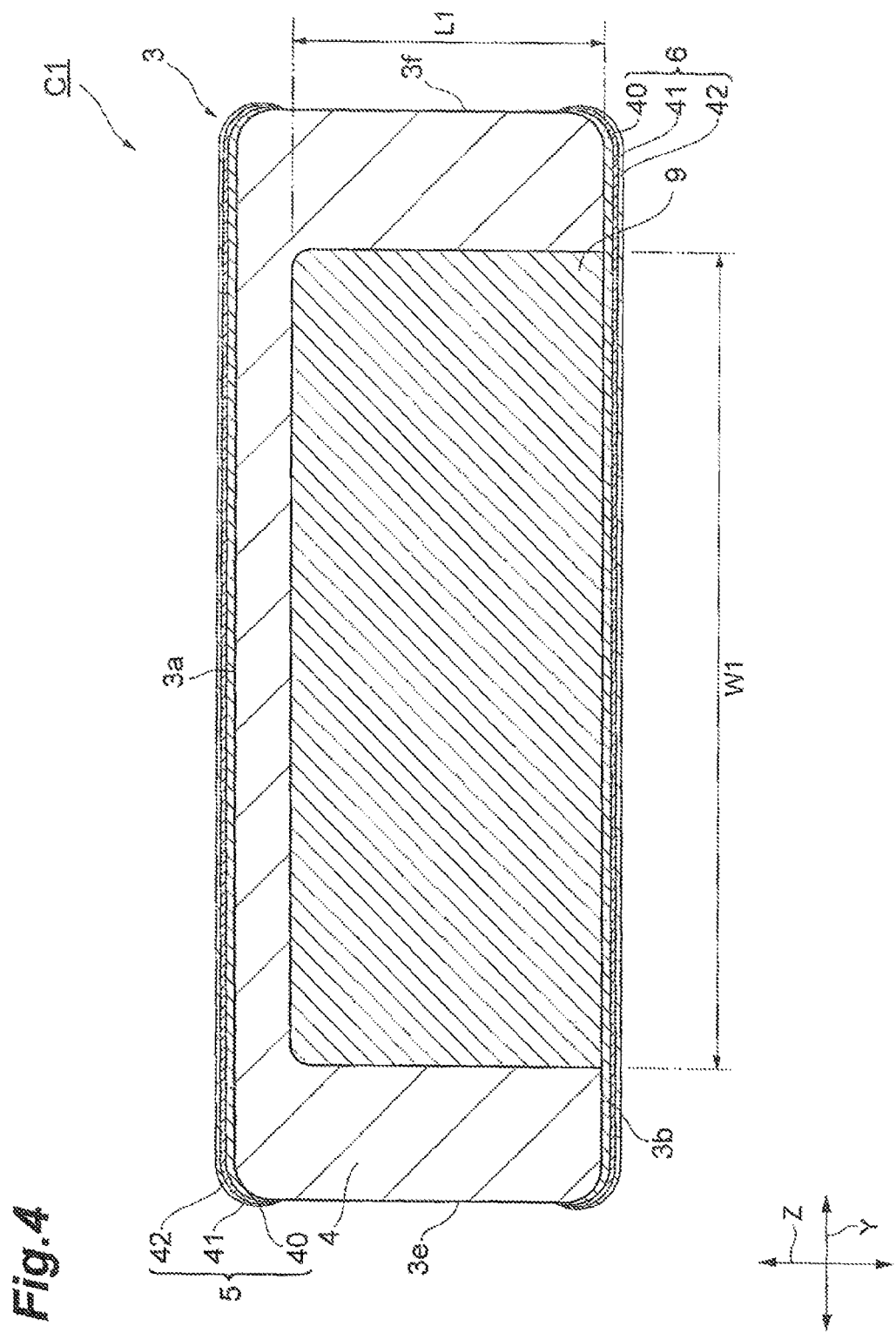
FIG. 4 is a cross-sectional including an internal electrode of the multilayer ceramic capacitor according to the first embodiment.
Figure 5:
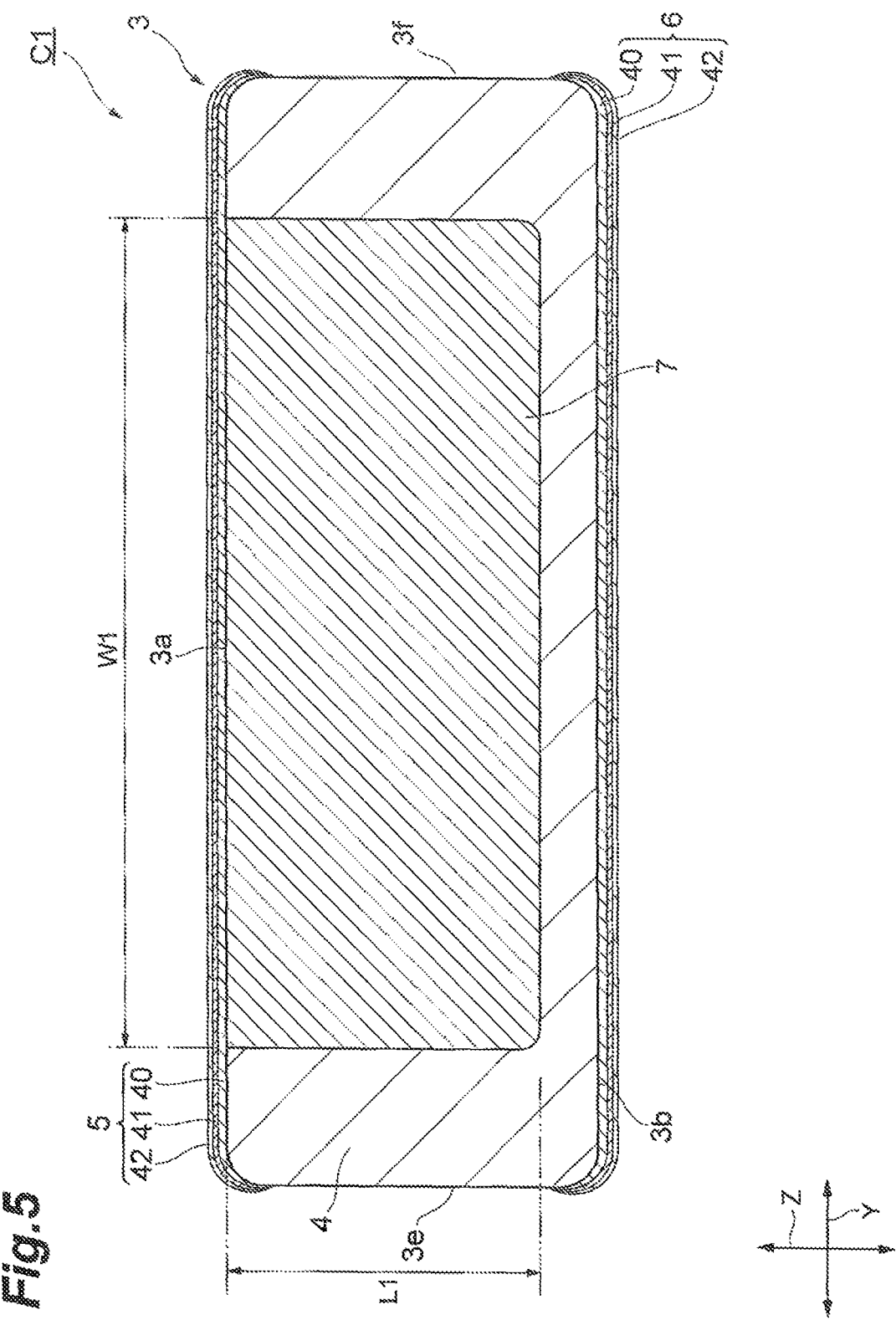
FIG. 5 is a cross-sectional view including an internal electrode of the multilayer ceramic capacitor according to the first embodiment.

First, a configuration of a multilayer ceramic capacitor according to a first embodiment will be described with reference to FIGS. 1 to 5. FIG. 1 is a perspective view of the multilayer ceramic capacitor according to the first embodiment. FIGS. 2 and 3 are cross-sectional views taken along a line II-II illustrated in FIG. 1. FIGS. 4 and 5 are cross-sectional views including an internal electrode of the multilayer ceramic capacitor according to the first embodiment.

In the drawings, for description of the configuration, XYZ directions are described as necessary.

As illustrated in FIGS. 1 to 5, a multilayer ceramic capacitor C1 includes an element body 3, terminal electrodes 5 and 6, and a plurality of internal electrodes 7, 8, 9, and 10.

The element body 3 has a substantially rectangular parallelepiped shape. In the element body 3, a length T in an X direction is longer than a length L in a Z direction, and the length T in the X direction is smaller than or equal to a length W in a Y direction.

The element body 3 has a first main surface 3a, a second main surface 3b, a first side surface 3c, a second side surface 3d, a third side surface 3e, and a fourth side surface 3f as its outer surfaces. The first main surface 3a and the second main surface 3b extend in the X direction and the Y direction and are opposed to each other. The first side surface 3c and the second side surface 3d extend in the Y direction and the Z direction and are opposed to each other. The third side surface 3e and the fourth side surface 3f extend in the X direction and the Z direction and are opposed to each other. The first side surface 3c, the second side surface 3d, the third side surface 3e, and the fourth side surface 3f extend to connect the first main surface 3a and the second main surface 3h. The X direction is a direction in which the first side surface 3c faces the second side surface 3d.

The element body 3 includes a dielectric 4. The dielectric 4 includes a plurality of dielectric layers are stacked in the X direction that is the direction in which the first side surface 3c faces the second side surface 3d. In the element body 3, a stacking direction of the plurality of dielectric layers coincides with the X direction. Each dielectric layer includes a sintered body of a ceramic green sheet including a dielectric material (for example, $BaTiO_3$, $Ba(Ti, Zr)O_3$, or $(Ba, Ca)TiO_3$-based dielectric ceramic). In the actual element body 3, each dielectric layer is integrated to an extent that a boundary between the dielectric layers is invisible.

The element body 3 includes an inner layer portion 11, and a pair of outer layer portions 12 (see FIG. 2). In the inner layer portion 11, a plurality of internal electrodes 7 to 10 and a plurality of dielectric layers are arranged alternately. The pair of outer layer portions 12 are arranged with the inner layer portion 11 interposed therebetween in the X direction. The plurality of internal electrodes 7 to 10 are not arranged in the pair of outer layer portions 12. In this embodiment, a ratio of a length T1 of each outer layer portion 12 to the length T of the element body 3 in the X direction is 0.05 to 0.2 (5 to 20%).

The terminal electrode 5 is arranged on the first main surface 3a. The terminal electrode 5 covers the first main surface 3a, an edge of the first side surface 3c, an edge of the second side surface 3d, an edge of the third side surface 3e, and an edge of the fourth side surface 3f. That is, the terminal electrode 5 includes an electrode portion located on the first main surface 3a, and an electrode portion located on a portion of each of the first side surface 3c, the second side surface 3d, the third side surface 3e, and the fourth side surface 3f.

The terminal electrode 6 is arranged on the second main surface 3b. The terminal electrode 6 covers the second main surface 3b, an edge of the first side surface 3c, an edge of the second side surface 3d, an edge of the third side surface 3e, and an edge of the fourth side surface 3f. That is, the terminal electrode 6 includes an electrode portion located on the second main surface 3b, and an electrode portion located on a portion of each of the first side surface 3c, the second side surface 3d, the third side surface 3e, and the fourth side surface 3f.

Each of the terminal electrodes 5 and 6 includes a sintered layer 40, and plated layers 41 and 42. The sintered layers 40 are made, for example, by applying a conductive paste including a conductive metal powder and a glass frit to an outer surface of the element body 3 and sintering the conductive paste. It is preferable for a conductive metal of the printed layers to be Cu, Ni, or the like. The plated layers 41 and 42 are made on the sintered layers 40 using a plating method. It is preferable for the plated layers 41 and 42 to be Ni, Cu, Sn, Au, or the like, and it is preferable for the outermost plated layers 42 to be Au, Sn, or the like. The terminal electrodes 5 and 6 are electrically insulated from each other on the outer surface of the element body 3.

One end portion of each internal electrode 7 is exposed to the first main surface 3a of the element body 3. Accordingly, the internal electrodes 7 are connected to the terminal electrode 5. The other end portions of the internal electrodes 7 are located inside the element body 3, and is not exposed to the second main surface 3b. That is, the internal electrodes 7 are not connected to the terminal electrode 6. One end portions of the internal electrodes 9 are exposed to the second main surface 3b of the element body 3. Accordingly, the internal electrodes 9 are connected to the terminal electrode 6. The other end portions of the internal electrodes 9 are located inside the element body 3, and are not exposed to the first main surface 3a. That is, the internal electrodes 9 are not connected to the terminal electrode 5.

One end portions of the internal electrodes 8 are exposed to the first main surface 3a of the element body 3. Accordingly, the internal electrodes 8 are connected to the terminal electrode 5. The other end portions of the internal electrodes 8 are located inside the element body 3, and are not exposed to the second main surface 3b. That is, the internal electrodes 8 are not connected to the terminal electrode 6. One end portions of the internal electrodes 10 are exposed to the second main surface 3b of the element body 3. Accordingly, the internal electrodes 10 are connected to the terminal electrode 6. The other end portions of the internal electrodes 10 are located inside the element body 3, and are not exposed to the first main surface 3a. That is, the internal electrodes 10 are not connected to the terminal electrode 5.

Since the internal electrodes 7 and the internal electrodes 8 are all connected to the terminal electrode 5, the internal electrodes 7 and the internal electrodes 8 all have the same polarity. Since the internal electrodes 9 and the internal electrodes 10 are all connected to the terminal electrodes 6, the internal electrodes 9 and the internal electrodes 10 all have the same polarity. Since the terminal electrode 5 and the terminal electrode 6 have different polarity from each other, the internal electrodes 7, 8 and the internal electrodes 9, 10 have different polarities from each other.

The internal electrodes 8 is arranged between pairs of the internal electrodes 7. Accordingly, three of the internal electrodes 7 and 8 connected to the terminal electrode 5 are arranged side by side in the X direction. The internal electrodes and 8 are arranged continuously in the X direction in an order of the internal electrode 7, the internal electrode 8, and the internal electrode 7. The internal electrodes 10 are arranged between pairs of the internal electrodes 9. Accordingly, three of the internal electrodes 9 and 10 connected to the terminal electrode 6 are arranged continuously in the X direction. The internal electrodes 9 and 10 are arranged continuously in the X direction in an order of the internal electrode 9, the internal electrode 10, and the internal electrode 9. The sets of three internal electrodes 7 and 8 arranged continuously in the X direction and the sets of three internal electrodes 9 and 10 continuously in the X direction are alternately arranged in the X direction.

The internal electrodes 7 and the internal electrodes 8 adjacent to each other in the X direction, the internal electrodes 7 and the internal electrodes 9 adjacent to each other in the X direction, and the internal electrodes 9 and the internal electrodes 10 adjacent to each other in the X direction all are opposed to each other and are arranged side by side at the same intervals in the X direction. That is, of the plurality of internal electrodes 7 to 10 arranged inside the element body 3 are arranged at the same intervals in the X direction. Here, the same interval may not be exactly the same but may include values with a small difference, a manufacturing error, or the like within a preset range. For example, the interval between the adjacent internal electrodes 7 and 9 is regarded as the same interval as long as the interval between the internal electrodes 7 and 9 is in the range of ±10% from an average value of the interval.

The internal electrodes 7 to 10 have, for example, substantially rectangular shapes in a plan view. The internal electrodes 7 to 10 have length W1 in the Y direction greater than a length L1 in the Z direction (see FIGS. 4 and 5). The internal electrodes 7 to 10 are made of a conductive material (for example, Ni or Cu) that is normally used for an internal electrode of a multilayer electric device. The internal electrodes 7 to 10 include sintered bodies of a conductive paste including the conductive material.

The element body 3 includes a plurality of different polarity opposed regions 20A, and a plurality of same polarity opposed regions 20B (see FIG. 3). The different polarity opposed regions 20A are located between the internal electrodes 7 and the internal electrodes 9 opposed to each other. Since the internal electrodes 7 and the internal electrodes 9 opposed to each other have different polarities from each other, the different polarity opposed regions 20A cause capacitance.

The same polarity opposed regions 20B are located between the internal electrodes 7 opposed to each other through the internal electrodes 8 and between the internal electrodes 9 opposed to each other through the internal electrodes 10. The internal electrodes 7 have the same polarities as each other, and the internal electrodes 8 interposed between the internal electrodes 7 also have the same polarity as the internal electrodes 7. Accordingly, the same polarity opposed regions 20B located between the internal electrodes 7 opposed to each other through the internal electrodes 8 do not cause capacitance. Similarly, the internal electrodes 9 all have the same polarity, and the internal electrodes 10 interposed between the internal electrodes 9 also have the same polarity as the internal electrodes 9. Accordingly, the same polarity opposed regions 20B located between the internal electrodes 9 opposed to each other through the internal electrodes 10 do not cause capacitance.

The internal electrodes 8 and 10 are arranged to partition the same polarity opposed regions 20B. The internal electrodes 8 divide the same polarity opposed regions 20B at the same intervals without contributing to the capacitance. The internal electrodes 10 divide the same polarity opposed regions 20B at the same intervals without contributing to the capacitance. The intervals in the X direction between the internal electrodes 8 and the internal electrodes 7 and the intervals in the X direction between the internal electrodes 10 and the internal electrodes 9 are all the same. Thus, all of the same polarity opposed regions 20B in the element body 3 are divided at the same intervals by the internal electrodes 8 and 9.

The different polarity opposed regions 20A and the same polarity opposed regions 20B are alternately located in the X direction. The different polarity opposed regions 20A are interposed between the same polarity opposed regions 20B adjacent to the different polarity opposed regions 20A. The different polarity opposed regions 20A causing capacitance and the same polarity opposed regions 20B causing no capacitance are distributed evenly inside the element body 3.

The multilayer ceramic capacitor C1 is mounted on an electronic device 101 (for example, a circuit board or an electronic component). In the multilayer ceramic capacitor C1, the first main surface 3a or the second main surface 3b of the element body 3 serves as a mounting surface for the electronic device. The multilayer ceramic capacitor C1 is mounted using a wire bonding scheme. Specifically, the terminal electrode 6 arranged on the second main surface 3b is connected to the electronic device 101 by a conductive adhesive or a Au/Sn solder 102 in a state in which the second main surface 3b faces the electronic device, and the terminal electrode 5 arranged on the first main surface 3a is connected to the electronic device by a wire 103. Further, the terminal electrode 5 arranged on the first main surface 3a may be connected to the electronic device by a conductive adhesive or a Au/Sn solder in a state in which the first main surface 3a faces the electronic device, and the terminal electrode 6 arranged on the second main surface 3b may be connected to the electronic device by a wire.

Thus, according to the multilayer ceramic capacitor C1 of this embodiment, since the length T in the X direction of the element body 3 is greater than the length L in the Z direction of the element body 3 and is smaller than or equal to the length W in the Y direction of the element body 3, the element body 3 has a low profile. The terminal electrode 5 is arranged on the first main surface 3a of the element body 3, and the terminal electrode 6 is arranged on the second main surface 3b of the element body 3. Accordingly, the first main surface 3a or the second main surface 3b constitutes a mounting surface for another electronic device. When the element body 3 is made by laminating a plurality of dielectric layers in the X direction parallel to the first main surface 3a and the second main surface 3b, the multilayer ceramic capacitor C1 in which the element body 3 has a low profile is realized even when the number of layers increases.

The internal electrodes 7 connected to the terminal electrode 5 and the internal electrodes 9 connected to the terminal electrode 6 have different polarities from each other. Accordingly, the different polarity opposed regions 20A located between the internal electrodes 7 and 9 opposed to each other cause capacitance. The internal electrodes 7 and the internal electrodes 8 have the same polarities as each other. The internal electrodes 9 and the internal electrodes 10 have the same polarities as each other. Thus, the same polarity opposed regions 20B located between the internal electrodes 7 opposed to each other through the internal electrodes 8, and the same polarity opposed regions 20B located between the internal electrodes 9 opposed to each other through the internal electrodes 10 cause no capacitance.

The element body 3 includes an arrangement region in which the plurality of internal electrodes 7 to 10 are arranged, and a non-arrangement region in which the plurality of internal electrodes 7 to 10 are not arranged. The arrangement region includes the plurality of different polarity opposed regions 20A causing capacitance, and the plurality of same polarity opposed regions 20B causing no capacitance. Desired capacitance can be ensured by the plurality of different polarity opposed regions 20A. The same polarity opposed regions 20B causing no capacitance are included in the arrangement region. Therefore, the multilayer ceramic capacitor C1, for example, has a greater length in the X direction of the arrangement region and a smaller length in the X direction of the non-arrangement region than a multilayer ceramic capacitor in which the internal electrodes having different polarities are alternately arranged and that has the element body of the same size as and has the same capacitance as the multilayer ceramic capacitor C1.

In the arrangement region, all the internal electrodes 7 to 10 are arranged at the same intervals in the X direction. Therefore, in the arrangement region, it is difficult for cracks caused by a difference in thermal shrinkage to occur. In the multilayer ceramic capacitor C1, the arrangement region is large, that is, a region in which it is difficult for cracks caused by a difference in thermal shrinkage to occur is wider than in the above-described comparison capacitor. Therefore, it is possible to suppress the occurrence of cracks caused by the difference in thermal shrinkage in the entire element body 3. In the multilayer ceramic capacitor C1, mechanical strain due to the electrostrictive effect occurs in the different polarity opposed regions 20A, whereas mechanical strain due to the electrostrictive effect does not occur in the same polarity opposed regions 20B. Since the different polarity opposed regions 20A and the same polarity opposed regions 20B are alternately located in the X direction, a region in which mechanical strain due to the electrostrictive effect occurs is distributed in the arrangement region, as compared to a configuration in which the arrangement region does not include the same polarity opposed regions 20B. Accordingly, concentration of stress caused by the mechanical strain is suppressed. Thus, it is possible to suppress occurrence of cracks in the element body 3.

Thus, it is possible to suppress the occurrence of cracks while ensuring desired capacitance.

According to the multilayer ceramic capacitor C1 of this embodiment, it is possible to suppress internal stress generated in the element body 3 due to the difference in thermal shrinkage. As a result, even when tensile stress is applied to the multilayer ceramic capacitor C1 (element body 3) when solder is solidified at the time of mounting the multilayer ceramic capacitor C1, it is possible to suppress the occurrence of cracks caused by the internal stress.

According to this embodiment, a ratio T1/T of the length T1 of each outer layer portion 12 to the length T of the element body 3 in the X direction is 0.05 to 0.2 (5 to 20%). In this case, the length in the X direction of the inner layer portion 11 can further increase. Therefore, it is possible to reliably suppress the occurrence of cracks caused by the difference in the thermal shrinkage, In this embodiment, it is preferable for the ratio T1/T of the length T1 of each outer layer portion 12 to the length T of the element body 3 to be 0.05 to 0.2 (5 to 20%), as specifically shown in Examples 1 to 6. In Examples 1 to 6, a multilayer ceramic capacitive component with an element body having the following dimensions: a length T in the X direction of 1200 μm, a length W in the Y direction of 2000 μm, and a length in the Z direction L of 500 μm was used, In Examples 1 to 6, in this multilayer ceramic capacitor, a thickness of an outer layer portion in which internal electrodes were not arranged was changed, the ratio T1/T of the length T1 of each outer layer portion to the length T of the element body was changed, and an occurrence rate of cracks was measured. FIG. 6 is a table showing measurement results of Examples 1 to 6.

In Examples 1 to 6, multilayer ceramic capacitor C1 described above was used. That is, the multilayer ceramic capacitor C1 in which the ratio T1/T of the length T1 of each outer layer portion 12 to the length T of the element body 3 was 0.05 to 0.2 (5 to 20%) was used. Specifically, in Example 1, the multilayer ceramic capacitor C1 in which the ratio T1/T was 0.033 (3.3%) was used. In Example 2, the multilayer ceramic capacitor C1 in which the ratio T1/T was 0.05 (5%) was used. In Example 3, the multilayer ceramic capacitor C1 in which the ratio T1/T was 0.1 (10%) was used. In Example 4, the multilayer ceramic capacitor C1 in which the ratio T1/T was 0.15 (15%) was used. In Example 5, the multilayer ceramic capacitor C1 in which the ratio T1/T was 0.2 (20%) was used. In Example 6, the multilayer ceramic capacitor C1 in which the ratio T1/T was 0.25 (25%) was used.

Crack occurrence rates in Examples 1 to 6 were measured at 0.001%, 0.001%, 0.005%, 0.019%, 0.074%, and 0.28%. In particular, when the ratio T1/T was 0.2 (20%) or less, it was confirmed that the occurrence of cracks could be more reliably suppressed than when the ratio T1/T was 0.25 (25%) or more. Even when the ratio T1/T was less than 0.05 (5%), the crack occurrence rate could be decreased, but since the outer layer portion of the element body was too thin, any cracks that occurred could easily reach the internal electrode. If the cracks reached the internal electrode, the capacitance decreased and desired capacitance could not be ensured. Therefore, it is preferable for the ratio T1/T to be 0.05 (5%) or more, it was confirmed from the above that it is preferable for the ratio T1/T of the length T1 of each outer layer portion 12 to the length T of the element body 3 to be 0.05 to 0.2 (5 to 20%).

Second Embodiment

Figure 7:
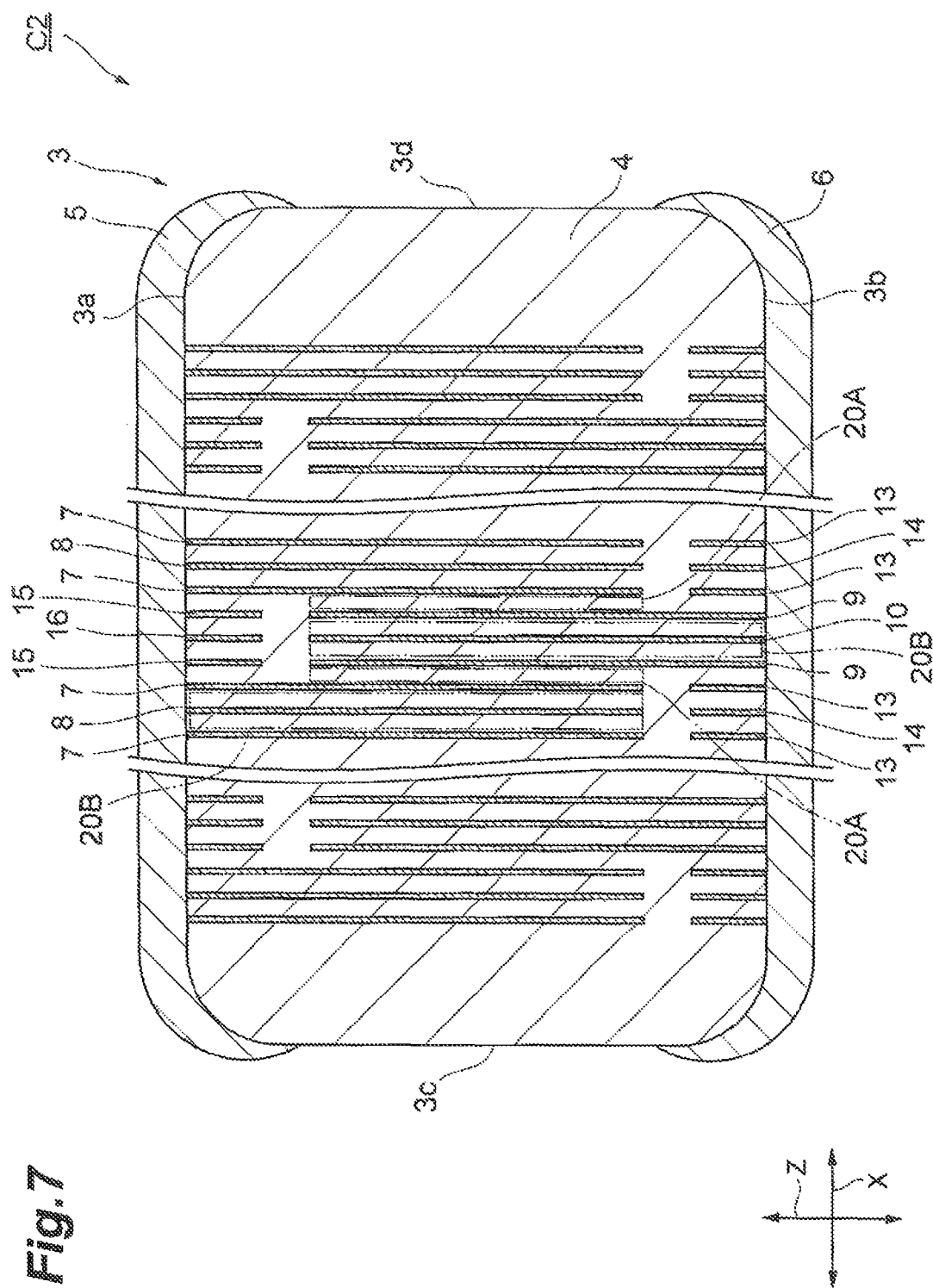
FIG. 7 is a cross-sectional view of a multilayer ceramic capacitor according to a second embodiment.

Next, a configuration of a multilayer ceramic capacitor according to a second embodiment will be described with reference to FIG. 7. FIG. 7 is a cross-sectional view of the multilayer ceramic capacitor according to the second embodiment. FIG. 7 is an XZ cross-sectional view corresponding to FIG. 3 in the first embodiment.

As illustrated in FIG. 7, a multilayer ceramic capacitor C2 according to this embodiment includes an element body 3, terminal electrodes 5 and 6, and a plurality of internal electrodes 7 to 10, similar to the multilayer ceramic capacitor C1 according to the above-described embodiment. In FIG. 7, the sintered layers 40 and the plated layers 41 and 42 of the terminal electrodes 5 and 6 are omitted.

A difference between the multilayer ceramic capacitor C2 according to this embodiment and the multilayer ceramic capacitor C1 according to the first embodiment is that the multilayer ceramic capacitor C2 includes a plurality of auxiliary electrodes 13, 14, 15, and 16, in addition to the internal electrodes 7 to 10, as a plurality of internal electrodes.

The auxiliary electrodes 13 are arranged in the same layer as the internal electrodes 7 in the X direction. That is, the auxiliary electrodes 13 are arranged in the same position as the internal electrodes 7 in the X direction. One end portions of the auxiliary electrodes 13 are exposed to the second main surface 3b of the element body 3. Accordingly, the auxiliary electrodes 13 are connected to the terminal electrode 6. The other end portions of the auxiliary electrodes 13 are spaced from the end portion of the internal electrodes 7 located inside the element body 3, which are opposed to each other in the Z direction in the element body 3. The other end portions of the auxiliary electrodes 13 are not exposed to the first main surface 3a. That is, the auxiliary electrodes 13 are not connected to the terminal electrode 5.

The auxiliary electrodes 15 are arranged in the same layer as the internal electrodes 9 in the X direction. That is, the auxiliary electrodes 15 are arranged in the same position as the internal electrodes 9 in the X direction. One end portions of the auxiliary electrodes 15 are exposed to the first main surface 3a of the element body 3. Accordingly, the auxiliary electrodes 15 are connected to the terminal electrode 5. The other end portions of the auxiliary electrodes 15 are spaced from the end portions of the internal electrodes 9 located inside the element body 3 and are opposed to each other in the Z direction inside the element body 3. The other end portions of the auxiliary electrodes 15 are not exposed to the second main surface 3b. That is, the auxiliary electrodes 15 are not connected to the terminal electrode 6.

The auxiliary electrodes 14 are arranged in the same layer as the internal electrodes 8 in the X direction. That is, the auxiliary electrodes 14 are arranged in the same position as the internal electrodes 8 in the X direction. One end portions of the auxiliary electrodes 14 are exposed to the second main surface 3b of the element body 3. Accordingly, the auxiliary electrodes 14 are connected to the terminal electrode 6. The other end portions of the auxiliary electrodes 14 are spaced from the end portion of the internal electrodes 8 located inside the element body 3, which are opposed to each other in the Z direction in the element body 3. The other end portions of the auxiliary electrodes 14 are not exposed to the first main surface 3a. That is, the auxiliary electrodes 14 are not connected to the terminal electrode 5.

The auxiliary electrodes 16 are arranged in the same layer as the internal electrodes 10 in the X direction. That is, the auxiliary electrodes 16 are arranged in the same position as the internal electrodes 10 in the X direction. One end portions of the auxiliary electrodes 16 are exposed to the first main surface 3a of the element body 3. Accordingly, the auxiliary electrodes 16 are connected to the terminal electrode 5. The other end portions of the auxiliary electrodes 16 are spaced from the end portions of the internal electrodes 10 located inside the element body 3, which are opposed to each other in the Z direction in the element body 3. The other end portions of the auxiliary electrodes 16 are not exposed to the second main surface 3b. That is, the auxiliary electrodes 16 are not connected to the terminal electrode 6.

The internal electrodes 7 and 8 and the auxiliary electrodes 15 and 16 are all connected to the terminal electrode 5. Therefore, the internal electrodes 7 and 8 and the auxiliary electrodes 15 and 16 have the same polarity. The inner electrodes 9 and 10 and the auxiliary electrodes 13 and 14 are all connected to the terminal electrode 6. Therefore, the internal electrodes 9 and 10 and the auxiliary electrodes 13 and 14 have the same polarity. The terminal electrode 5 and the terminal electrode 6 have different polarity from each other. Therefore, the electrodes 7, 8, 15, 16 and the electrodes 9, 10, 13, 14 have different polarities from each other.

The auxiliary electrodes 14 are arranged between pairs of the auxiliary electrodes 13. Accordingly, three of the auxiliary electrodes 13 and 14 connected to the terminal electrode 6 are arranged continuously in the X direction. The auxiliary electrodes 13 and 14 are continuously arranged in an order of an auxiliary electrode 13, an auxiliary electrode 14, and an auxiliary electrode 13 in the X direction. The auxiliary electrodes 16 are arranged between pairs of the auxiliary electrodes 15. Accordingly, three of the auxiliary electrodes 15 and 16 connected to the terminal electrode 5 are arranged continuously in the X direction. The auxiliary electrodes 15 and 16 are continuously arranged in an order of an auxiliary electrode 15, an auxiliary electrode 16, and an auxiliary electrode 15 in the X direction. The sets of three auxiliary electrodes 13 and 14 arranged continuously in the X direction and the sets of three auxiliary electrodes 15 and 16 arranged continuously in the X direction are arranged alternately in the X direction.

All of the auxiliary electrodes 13 and the auxiliary electrodes 14 adjacent to each other, the auxiliary electrodes 13 and the internal electrodes 9 adjacent to each other, the internal electrodes 7 and the auxiliary electrodes 15 adjacent to each other, the auxiliary electrodes 15 and the auxiliary electrodes 16 adjacent to each other, the auxiliary electrodes 15 and the internal electrodes 7 adjacent to each other are opposed to each other and are arranged side by side at the same intervals in the X direction. In other words, the plurality of internal electrodes 7 to 10 and the plurality of auxiliary electrodes 13 to 16 arranged inside the element body 3 are all arranged at the same intervals in the X direction.

Sizes and materials of the auxiliary electrodes 13 to 16 are the same as those of the internal electrodes 7 to 10. That is, the auxiliary electrodes 13 to 16 have, for example, substantially rectangular shapes in a plan view, and a length W1 in the Y direction is greater than a length L1 in the Z direction. The auxiliary electrodes 13 to 16 are made of a conductive material (for example, Ni or Cu) that is normally used for internal electrodes of a multilayer electric device, and include sintered bodies of a conductive paste including the conductive material.

Thus, in the multilayer ceramic capacitor C2 of this embodiment, the element body 3 includes an arrangement region in which the plurality of internal electrodes 7 to 10 are arranged, and a non-arrangement region in which the plurality of internal electrodes 7 to 10 are not arranged. The arrangement region includes a plurality of different polarity opposed regions 20A causing capacitance, and a plurality of same polarity opposed regions 20B causing no capacitance. Desired capacitance can be ensured by the plurality of different polarity opposed regions 20A. The plurality of same polarity opposed regions 20B causing no capacitance are included in the arrangement region. Therefore, the multilayer ceramic capacitor C2, for example, has a greater length in the X direction of the arrangement region and a smaller length in the X direction of the non-arrangement region than a multilayer ceramic capacitor in which the internal electrodes having different polarities are alternately arranged and that has the element body of the same size as and has the same capacitance as the multilayer ceramic capacitor C2.

In the arrangement region, all of the internal electrodes 7 to 10 and the auxiliary electrodes 13 to 16 are arranged at the same intervals in the X direction. Therefore, in the arrangement region, it is difficult for cracks caused by a difference in thermal shrinkage to occur. In the multilayer ceramic capacitor C2, the arrangement region is large, that is, a region in which it is difficult for the cracks caused by a difference in thermal shrinkage to occur is wider than in to the above-described comparison capacitor. Therefore, it is possible to suppress the occurrence of cracks caused by the difference in thermal shrinkage in the entire element body 3. In the multilayer ceramic capacitor C2, mechanical strain due to the electrostrictive effect occurs in the different polarity opposed regions 20A, whereas mechanical strain due to the electrostrictive effect does not occur in the same polarity opposed regions 20B. Since the different polarity opposed regions 20A and the same polarity opposed regions 20B are alternately located in the X direction, a region in which the mechanical strain due to the electrostrictive effect occurs is distributed in the arrangement region, as compared to a configuration in which the arrangement region does not include the same polarity opposed regions 20B. Accordingly, because concentration of stress caused by the mechanical strain is suppressed, it is possible to suppress occurrence of cracks in the element body 3. Thus, it is possible to suppress the occurrence of cracks while ensuring desired capacitance.

According to the multilayer ceramic capacitor C2 in this embodiment, the auxiliary electrodes 13 and 14 can increase connection strength between the terminal electrode 6 and the element body 3. The auxiliary electrodes 15 and 16 can increase connection strength between the terminal electrode 5 and the element body 3.

While the multilayer ceramic capacitor C2 includes the plurality of auxiliary electrodes 13 to 16 as internal electrodes in the above-described embodiment, the multilayer ceramic capacitor C2 may not include all of the plurality of auxiliary electrodes 13 to 16. That is, the multilayer ceramic capacitor C2 may include at least some of the plurality of auxiliary electrodes 13 to 16.

Third Embodiment

Next, a configuration of a multilayer ceramic capacitor according to a third embodiment will be described with reference to FIG. 8. FIG. 8 is a cross-sectional view of the multilayer ceramic capacitor according to the third embodiment. FIG. 8 is an XZ cross-sectional view corresponding to FIG. 3 in the first embodiment. In FIG. 8 the sintered layers 40 and the plated layers 41 and 42 included in the terminal electrodes 5 and 6 are omitted.

As illustrated in FIG. 8, a multilayer ceramic capacitor C3 according to this embodiment includes an element body 3, terminal electrodes 5 and 6, and a plurality of internal electrodes 7 to 10, similar to the multilayer ceramic capacitor C1 according to the above-described embodiment.

A difference between the multilayer ceramic capacitor C3 according to this embodiment and the multilayer ceramic capacitor C1 of the first embodiment is that the internal electrodes 8 and 10 are not connected to any of the terminal electrodes 5 and 6.

In this embodiment, a length L2 in a Z direction of the internal electrodes 8 and 10 is longer than a length L3 in the Z direction of the different polarity opposed regions 20A. Both end portions of the internal electrodes 8 and 10 are legated inside the element body 3 and are not exposed to first and second main surfaces 3a and 3b of the element body 3. That is, the internal electrodes 8 and 10 are not connected to any of the terminal electrodes 5 and 6. The internal electrodes 8 not connected to the terminal electrode 6 do not have a polarity different from that of at least the internal electrodes 7. The internal electrodes 10 not connected to the terminal electrode 5 do not have a polarity different from that of at least the internal electrodes 9.

The internal electrodes 7 all have the same polarity, and the internal electrodes 8 interposed between the internal electrodes 7 do not have a polarity different from that of at least the internal electrodes 7. Accordingly, the same polarity opposed regions 20B located between the internal electrodes 7 opposed to each other through the internal electrodes 8 do not cause capacitance. Similarly, the internal electrodes 9 opposed to each other have the same polarity, and the internal electrodes 10 interposed between the internal electrodes 9 do not have a polarity different from that of at least the internal electrodes 9. Accordingly, the same polarity opposed regions 20B located between the internal electrodes 9 opposed to each other through the internal electrodes 10 do not cause capacitance.

Thus, in the multilayer ceramic capacitor C3 according to this embodiment, it is possible to suppress occurrence of cracks while maintaining desired capacitance, as in the first embodiment.

According to the multilayer ceramic capacitor C3 in this embodiment, the length L2 in the Z direction of the internal electrodes 8 and 10 is greater than the length L3 in the Z direction of the different polarity opposed regions 20A. Accordingly, it is possible to suppress mechanical strain caused by the electrostrictive effect, and to further suppress occurrence of cracks.

While the length L2 in the Z direction of the internal electrodes 8 and 10 is greater than the length L3 in the Z direction of the different polarity opposed regions 20A in the above-described embodiment, the length in the Z direction of the internal electrodes 8 and 10 L2 may be less than or equal to the length L3 in the Z direction of the different polarity opposed regions 20A.

Fourth Embodiment

Figure 9:
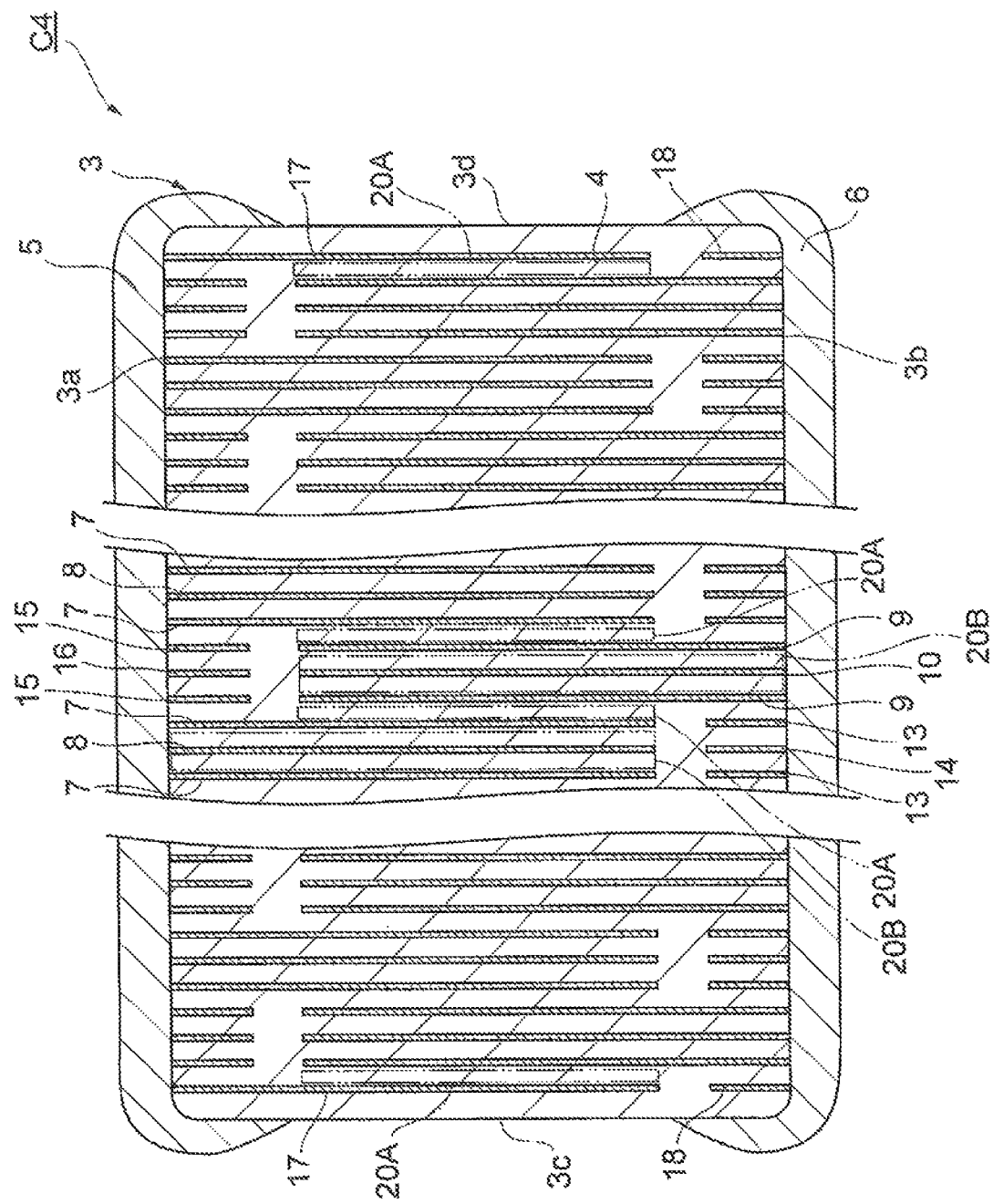
FIG. 9 is a cross-sectional view of a multilayer ceramic capacitor according to a fourth embodiment.

Next, a configuration of a multilayer ceramic capacitor according to a fourth embodiment will be described with reference to FIG. 9. FIG. 9 is a cross-sectional view of the multilayer ceramic capacitor according to a fourth embodiment. FIG. 9 is an XZ cross-sectional view corresponding to FIG. 3 in the first embodiment. In FIG. 9, the sintered layers 40 and the plated layers 41 and 42 included in the terminal electrodes 5 and 6 are omitted.

As illustrated in FIG. 9, a multilayer ceramic capacitor C4 according to this embodiment includes an element body 3, terminal electrodes 5 and 6, a plurality of internal electrodes 7 to 10, and a plurality of auxiliary electrodes 13 to 16, similarly to the multilayer ceramic capacitor C2 according to the second embodiment described above.

A difference between the multilayer ceramic capacitor C4 of this embodiment and the multilayer ceramic capacitor C2 according to the second embodiment is that adjustment electrodes 17 and auxiliary adjustment electrodes 18 are further included on an outermost layer in the X direction.

The adjustment electrodes 17 face the internal electrodes 9 arranged on the outermost layers in the X direction among the plurality of internal electrodes. That is, the adjustment electrodes 17 are arranged adjacent to the internal electrodes 9 at both ends in the X direction. One end portions of the adjustment electrodes 17 are exposed to a first main surface 3a of the element body 3. Accordingly, the adjustment electrodes 17 are connected to the terminal electrode 5. The other end portions of the adjustment electrodes 17 are located inside the element body 3 and are not exposed to the second main surface 3b. That is, the adjustment electrodes 17 are not connected to the terminal electrode 6.

The auxiliary adjustment electrodes 18 are arranged on the same layer as the adjustment electrodes 17 in the X direction. That is, the auxiliary adjustment electrodes 18 are arranged adjacent to the internal electrodes 9 at both ends in the X direction. One end portions of the auxiliary adjustment electrodes 18 are exposed to the second main surface 3b of the element body 3. Thus, the auxiliary adjustment electrodes 18 are connected to the terminal electrode 6. The other end portions of the auxiliary adjustment electrodes 18 face, in the Z direction, the end portions of the adjustment electrodes 17 located inside the element body 3, in the element body 3. The other end portions of the auxiliary adjustment electrodes 18 are not exposed to the first main surface 3a. That is, the auxiliary adjustment electrodes 18 are not connected to the terminal electrode 5.

The adjustment electrodes 17 have a polarity different from that of the internal electrodes 9. Accordingly, capacitance is caused between the internal electrodes 9 and the adjustment electrodes 17 opposed to each other. Different polarity opposed regions 20A are located between the adjustment electrodes 17 and the internal electrodes 9 opposed to each other. The adjustment electrodes 17 have a function of finely adjusting capacitance of the multilayer ceramic capacitor C4 in a lamination step at the time of manufacture of the multilayer ceramic capacitor C4.

Intervals between the electrodes 17, 18 and the electrodes 9 adjacent thereto in the X direction are the same as intervals between the electrodes 7 to 10 and the electrodes 13 to 16 opposed to each other in the X direction and arranged at the same intervals. In other words, all of the plurality of internal electrodes 7 to 10, the auxiliary electrodes 13 to 16, the adjustment electrodes 17, and the auxiliary adjustment electrodes 18 arranged inside the element body 3 are arranged at the same intervals in the X direction.

Thus, in the multilayer ceramic capacitor C4 of this embodiment, it is possible to suppress occurrence of cracks while maintaining desired capacitance, as in the first embodiment.

According to the multilayer ceramic capacitor C4 of this embodiment, capacitance is generated between the internal electrodes 9 and the adjustment electrodes 17. Accordingly, the multilayer ceramic capacitor C4 of which the capacitance has been finely adjusted is obtained.

The multilayer ceramic capacitor C4 may include adjustment electrodes connected to the terminal electrode 6, in place of or in addition to the adjustment electrodes 17 connected to the terminal electrode 5. The adjustment electrodes face the internal electrodes 7 arranged on the outermost layer in the X direction among the plurality of internal electrodes 7 to 10. The adjustment electrodes are connected to the terminal electrode 6 and are not connected to the terminal electrode 5. Different polarity opposed regions 20A causing capacitance are located between the adjustment electrodes and the internal electrodes 7.

In the above-described embodiment, the multilayer ceramic capacitor C4 includes the auxiliary adjustment electrodes 18 together with the adjustment electrodes 17, but the present invention is not limited thereto. For example, the multilayer ceramic capacitor C4 may include the adjustment electrodes 17 without including the auxiliary adjustment electrodes 18. Further, in the above-described embodiment, the adjustment electrodes 17 are arranged at both ends in the X direction, but the present invention is not limited thereto and one adjustment electrode 17 may be arranged at one end in the X direction.

In the above-described embodiment, the plurality of internal electrodes 7 to 10, the plurality of auxiliary electrodes 13 to 16, the adjustment electrodes 17, and the auxiliary adjustment electrodes 18 are all arranged at the same intervals in the X direction, but the present invention is not limited thereto. For example, intervals between the electrodes 17, 18 on the outermost layer in the X direction and the electrodes 9 adjacent thereto may not be exactly the same as the intervals between the plurality of other internal electrodes arranged inside the element body 3.

Fifth Embodiment

Next, a configuration of a multilayer ceramic capacitor according to a fifth embodiment will be described with reference to FIG. 10. FIG. 10 is a cross-sectional view of the multilayer ceramic capacitor according to the fifth embodiment. FIG. 10 is an XZ cross-sectional view corresponding to FIG. 3 in the first embodiment. In FIG. 10, the sintered layers 40 and the plated layers 41 and 42 included in the terminal electrodes 5 and 6 are omitted.

As illustrated in FIG. 10, a multilayer ceramic capacitor C5 according to this embodiment includes an element body 3, terminal electrodes 5 and 6, and a plurality of internal electrodes 7 to 10, similarly to the multilayer ceramic capacitor C3 of the third embodiment described above. In the third embodiment, the length L2 in the Z direction of the internal electrodes 8 and 10 is greater than the length L3 in the Z direction of the different polarity opposed regions 20A, whereas in this embodiment, a length L2 in the Z direction of internal electrodes 8 and 10 is substantially the same as a length L3 in the Z direction of the different polarity opposed regions 20A.

A difference between the multilayer ceramic capacitor C5 according to this embodiment and the multilayer ceramic capacitor C3 according to the third embodiment is that the multilayer ceramic capacitor C5 further includes a plurality of adjustment electrodes 30 arranged with a dielectric 4 interposed therebetween such that a plurality of capacitive components connected in series between the terminal electrode 5 and the terminal electrode 6 are constituted on the outermost layer in the X direction. The plurality of adjustment electrodes 30 face the internal electrodes 7 arranged on an outermost layer in the X direction among the plurality of internal electrodes. That is, the plurality of adjustment electrodes 30 are arranged adjacent to the internal electrodes 9 at both ends in the X direction.

The adjustment electrodes 30 include main electrodes 25, main electrodes 27, and intermediate electrodes 26. The main electrodes the outermost layer in the X direction face the internal electrodes 7 through the intermediate electrodes 26. One end portions of the main electrodes 25 are exposed to the first main surface 3a of the element body 3. Accordingly, the main electrodes 25 are connected to the terminal electrode 5. The other end portions of the main electrodes 25 are located inside the element body 3, and are not exposed to the second main surface 3b. That is, the main electrodes 25 are not connected to the terminal electrode 6.

The main electrodes 27 are arranged in the same layer as the main electrodes 25 in the X direction. That is, the main electrodes 27 on the outermost layer in the X direction face the internal electrodes 7 through the intermediate electrodes 26. One end portions of the main electrodes 27 are exposed to the second main surface 3b of the element body 3. Accordingly, the main electrodes 27 are connected to the terminal electrode 6. The other end portions of the main electrodes 27 are located inside the element body 3 and are not exposed to the first main surface 3a. That is, the main electrodes 27 are not connected to the terminal electrode 5.

The intermediate electrodes 26 are arranged between the main electrodes 25, 27 and the internal electrodes 7 opposed to the main electrodes 25, 27 in the X direction. Both end portions of the intermediate electrodes 26 are located inside the element body 3 and are not exposed to the fast main surface 3a and the second main surface 3b. That is, the intermediate electrodes 26 are not connected to either of the terminal electrodes 5 and 6.

The main electrodes 25 and 27 and the intermediate electrodes 26 are arranged to are opposed to each other with the dielectric 4 interposed therebetween. The main electrodes 25 and the main electrodes 27 share the intermediate electrodes 26. First capacitive components $C_1$ are constituted in region in which the main electrodes 25 and the intermediate electrodes 26 are opposed to each other. Second capacitive components $C_2$ are constituted in regions in which the main electrodes 27 and the intermediate electrodes 26 are opposed to each other. Accordingly, the first capacitive components $C_1$ and the second capacitive components $C_2$ connected in series are constituted between the main electrodes 25 and the main electrodes 27. That is, the plurality of capacitive components connected in series are constituted between the terminal electrode 5 and the terminal electrode 6.

Thus, in the multilayer ceramic capacitor C5 according to this embodiment, it is possible to suppress occurrence of cracks while ensuring a desired capacitance, as in the above-described embodiments.

According to the multilayer ceramic capacitor C5 in this embodiment, the plurality of capacitive components (the first capacitive components $C_1$ and the second capacitive components $C_2$) connected in series are constituted on the outermost layer in the X direction. Accordingly, the multilayer ceramic capacitor C5 with finely adjusted capacitance can be obtained.

While various embodiments of the present invention have been described above, the present invention is not limited to the above-described embodiments. The present invention may be modified within a range not charming the gist defined in the claims, or may be otherwise applied.

As long as the effects of the present invention are achieved, the arrangement in the X direction of the plurality of internal electrodes is not limited to the arrangement in the above-described embodiment. For example, in the first embodiment, the sets of three continuously arranged internal electrodes 7 and 8 and the sets of three continuously arranged internal electrodes 9 and 10 are alternately arranged in the X direction. However, for example, sets of four or more continuously arranged internal electrodes 7 and 8 and sets of four or more continuously arranged internal electrodes 9 and 10 may be alternately arranged in the X direction.

In the multilayer ceramic capacitor C4 including the adjustment electrodes 17 and the auxiliary adjustment electrodes 18 according to the fourth embodiment, the internal electrodes 8 are connected to the terminal electrode 5 and the internal electrodes 9 are connected to the terminal electrode 6, but the present invention is not limited thereto. For example, in the multilayer ceramic capacitor C4, the internal electrodes 8 and 9 may not be connected to either of the terminal electrodes 5 and 6. Further, while the multilayer ceramic capacitor C4 according to the fourth embodiment includes the auxiliary electrodes 13 to 16 as the internal electrodes, the multilayer ceramic capacitor C4 may not include the auxiliary electrodes 13 to 16 as internal electrodes.

According to the multilayer ceramic capacitor in the above-described embodiment, the length W in the Y direction of the element body 3 is greater than the length T in the X direction of the element body 3. In a normal multilayer ceramic capacitor, a length in the Y direction of the clement body is greater than a length in the X direction of the element body, and terminal electrodes are arranged on the third side surface and the fourth side surface opposed to each other in the Y direction. Accordingly, a mounting area of the multilayer ceramic capacitor according to the above-described embodiment can be the same as that of such a typical multilayer ceramic capacitor.

What is claimed is:

1. A multilayer ceramic capacitor, comprising:
an element body including a dielectric;
a first terminal electrode and a second terminal electrode; and
a plurality of internal electrodes,
wherein the element body includes a first main surface, a second main surface, a first side surface, a second side surface, a third side surface, and a fourth side surface, and includes an inner layer portion in which the plurality of internal electrodes are arranged and a pair of outer layer portions in which the plurality of internal electrodes are not arranged,
the first main surface and the second main surface extend in a first direction and a second direction intersecting the first direction, and are opposed to each other, the first main surface or the second main surface constituting a mounting surface,
the first side surface and the second side surface extend in the second direction and in a third direction that is a direction in which the first main surface and the second main surface are opposed to each other to connect the first main surface and the second main surface, and are opposed to each other, and
the third side surface and the fourth side surface extend in the first direction and the third direction so as to connect between the first main surface and the second main surface, and face each other,
the first terminal electrode is arranged on the first main surface,
the second terminal electrode is arranged on the second main surface,
the plurality of internal electrodes are arranged at the same intervals in the first direction so as to are opposed to each other inside the element body,
a length in the first direction of the element body is greater than a length in the third direction of the element body and is smaller than or equal to a length in the second direction of the element body,
a length in the second direction of the plurality of internal electrodes is greater than a length in the third direction of the plurality of internal electrodes,
the plurality of internal electrodes include a plurality of first internal electrodes, a plurality of second internal electrodes, a plurality of third internal electrodes, and a plurality of fourth internal electrodes,
the plurality of first internal electrodes are connected to the first terminal electrode and are not connected to the second terminal electrode,
the plurality of second internal electrodes are connected to the second terminal electrode and are not connected to the first terminal electrode,
the plurality of third internal electrodes are not connected to at least the second terminal electrode, and
the plurality of fourth internal electrodes are not connected to at least the first terminal electrode,
the element body includes a plurality of first regions and a plurality of second regions,
the plurality of first regions are located between the first internal electrodes and the second internal electrodes opposed to each other,
the plurality of second regions are located between the first internal electrodes opposed to each other through the third internal electrodes, and between the second internal electrodes opposed to each other through the fourth internal electrodes,
the first regions and the second regions are alternately located in the first direction,
the pair of outer layer portions are arranged with the inner layer portion interposed therebetween in the first direction, and
a ratio of a length in the first direction of each outer layer portion to a length in the first direction of the element body is 0.05 to 0.2.

2. The multilayer ceramic capacitor according to claim 1, wherein intervals in the first direction between the third internal electrodes and the first internal electrodes and intervals in the first direction between the fourth internal electrodes and the second internal electrodes are the same as each other.

3. The multilayer ceramic capacitor according to claim 1, wherein the plurality of internal electrodes include a plurality of first auxiliary electrodes, a plurality of second auxiliary electrodes, a plurality of third auxiliary electrodes, and a plurality of fourth auxiliary electrodes,
the plurality of first auxiliary electrodes are arranged in the same layer as the first internal electrodes in the first direction and connected to the second terminal electrode,
the plurality of second auxiliary electrodes are arranged in the same layer as the second internal electrodes in the first direction and connected to the first terminal electrode,
the plurality of third auxiliary electrodes are arranged in the same layer as the third internal electrodes in the first direction and connected to the second terminal electrode, and
the plurality of fourth auxiliary electrodes are arranged in the same layer as the fourth internal electrodes in the first direction and connected to the first terminal electrode.

4. The multilayer ceramic capacitor according to claim 1, wherein the third internal electrodes or the fourth internal electrodes are not connected to either of the first terminal electrode and the second terminal electrode.

5. The multilayer ceramic capacitor according to claim 1, wherein a length in a third direction of the third internal electrodes or the fourth internal electrodes is greater than the length in the third direction of the first region.

6. The multilayer ceramic capacitor according to claim 1, further comprising:
an adjustment electrode,
wherein the adjustment electrode is arranged to face the first internal electrodes arranged on the outermost layer in the first direction among the plurality of internal electrodes, is connected to the second terminal electrode, and is not connected to the first terminal electrode.

7. The multilayer ceramic capacitor according to claim 1, further comprising:
a plurality of adjustment electrodes,
wherein the plurality of adjustment electrodes are arranged with a dielectric interposed therebetween so that a plurality of capacitive components connected in series between the first terminal electrode and the second terminal electrode are constituted on the outermost layer in the first direction.

8. A multilayer ceramic capacitor, comprising:

an element body including a dielectric;

a first terminal electrode and a second terminal electrode, one of the first terminal electrode and the second terminal electrode being connected to a conductive adhesive or a solder and the other of the first terminal electrode and the second terminal electrode being connected to a wire; and a plurality of internal electrodes, wherein the element body includes a first main surface, a second main surface, a first side surface, a second side surface, a third side surface, and a fourth side surface, the first main surface and the second main surface extend in a first direction and a second direction intersecting the first direction, and are opposed to each other, the first side surface and the second side surface extend in the second direction and in a third direction that is a direction in which the first main surface and the second main surface are opposed to each other to connect the first main surface and the second main surface, and are opposed to each other, and the third side surface and the fourth side surface extend in the first direction and the third direction so as to connect between the first main surface and the second main surface, and face each other, the first terminal electrode is arranged on the first main surface, the second terminal electrode is arranged on the second main surface, the plurality of internal electrodes are arranged at the same intervals in the first direction so as to be opposed to each other inside the element body, a length in the first direction of the element body is greater than a length in the third direction of the element body and is smaller than or equal to a length in the second direction of the element body, a length in the second direction of the plurality of internal electrodes is greater than a length in the third direction of the plurality of internal electrodes, the plurality of internal electrodes include a plurality of first internal electrodes, a plurality of second internal electrodes, a plurality of third internal electrodes, and a plurality of fourth internal electrodes, the plurality of first internal electrodes are connected to the first terminal electrode and are not connected to the second terminal electrode, the plurality of second internal electrodes are connected to the second terminal electrode and are not connected to the first terminal electrode, the plurality of third internal electrodes are not connected to at least the second terminal electrode, and the plurality of fourth internal electrodes are not connected to at least the first terminal electrode, the element body includes a plurality of first regions and a plurality of second regions, the plurality of first regions are located between the first internal electrodes and the second internal electrodes opposed to each other, the plurality of second regions are located between the first internal electrodes opposed to each other through the third internal electrodes, and between the second internal electrodes opposed to each other through the fourth internal electrodes, and the first regions and the second regions are alternately located in the first direction.

* * * * *